(12) United States Patent
Kulshrestha et al.

(10) Patent No.: US 11,787,932 B2
(45) Date of Patent: Oct. 17, 2023

(54) POLYLACTIC RESIN COMPOSITIONS FOR PAPERBOARD COATING AND PAPERBOARD COATING PROCESSES USING THE COMPOSITIONS

(71) Applicant: NatureWorks LLC, Minnetonka, MN (US)

(72) Inventors: Aman Kulshrestha, Minnetonka, MN (US); Eric Meierdierks, Los Alamos, NM (US); Joshua Weed, Minneapolis, MN (US); Nicole Whiteman, Plymouth, MN (US)

(73) Assignee: NatureWorks LLC, Plymouth, MN (US)

( * ) Notice: Subject to any disclaimer, the term of this patent is extended or adjusted under 35 U.S.C. 154(b) by 401 days.

(21) Appl. No.: 16/759,801

(22) PCT Filed: Nov. 30, 2018

(86) PCT No.: PCT/US2018/063181
§ 371 (c)(1),
(2) Date: Apr. 28, 2020

(87) PCT Pub. No.: WO2019/108866
PCT Pub. Date: Jun. 6, 2019

(65) Prior Publication Data
US 2020/0339805 A1 Oct. 29, 2020

Related U.S. Application Data

(60) Provisional application No. 62/594,007, filed on Dec. 3, 2017.

(51) Int. Cl.
*C08L 67/04* (2006.01)
*B05D 1/26* (2006.01)
(Continued)

(52) U.S. Cl.
CPC .............. *C08L 67/04* (2013.01); *B05D 1/265* (2013.01); *B05D 3/007* (2013.01); *B32B 27/10* (2013.01); *B32B 27/36* (2013.01); *B32B 37/153* (2013.01); *C09D 167/04* (2013.01); *B32B 2037/243* (2013.01); *B32B 2317/12* (2013.01); *B32B 2367/00* (2013.01); *C08G 63/912* (2013.01);
(Continued)

(58) Field of Classification Search
None
See application file for complete search history.

(56) References Cited

U.S. PATENT DOCUMENTS 5,210,108 A 5/1993 Spinu
5,225,521 A 7/1993 Spinu
(Continued)

FOREIGN PATENT DOCUMENTS

EP 632081 A 6/1994
GB 2277324 A 6/1994
(Continued)

*Primary Examiner* — Vivian Chen

(57) ABSTRACT

A polyester blend is made in a reaction of a linear polylactide resin and a thermoplastic epoxy group-containing polymer. The polyester blend is blended with a polyester having a glass transition temperature below 0C to form a polyester blend that is particular useful for making paperboard coatings in a melt extrusion process.

10 Claims, 1 Drawing Sheet

(51) Int. Cl.
*B05D 3/00* (2006.01)
*B32B 27/10* (2006.01)
*B32B 27/36* (2006.01)
*B32B 37/15* (2006.01)
*C09D 167/04* (2006.01)
*B32B 37/24* (2006.01)
*C08G 63/91* (2006.01)
*C08L 33/06* (2006.01)

(52) U.S. Cl.
CPC .............. *C08L 33/06* (2013.01); *C08L 33/068* (2013.01); *C08L 2201/06* (2013.01); *C08L 2205/025* (2013.01); *C08L 2205/03* (2013.01); *C08L 2205/05* (2013.01); *C08L 2314/00* (2013.01)

(56) References Cited

U.S. PATENT DOCUMENTS

| | | | | |
|---|---|---|---|---|
| 5,359,026 | A | | 10/1994 | Gruber |
| 5,594,095 | A | | 1/1997 | Gruber |
| 5,798,435 | A | * | 8/1998 | Gruber .................. C08G 63/08 528/361 |
| 5,998,552 | A | * | 12/1999 | Gruber .................. C08G 63/08 525/437 |
| 6,183,814 | B1 | * | 2/2001 | Nangeroni ........... C09D 167/04 427/361 |
| 6,291,597 | B1 | * | 9/2001 | Gruber .................. C08G 63/08 525/437 |
| 6,346,599 | B1 | * | 2/2002 | Goldberg .............. C08G 63/08 428/338 |
| 7,354,973 | B2 | * | 4/2008 | Flexman ............... C08L 67/04 525/166 |
| 10,351,701 | B2 | * | 7/2019 | Georgelos ............ B32B 27/08 |
| 2004/0092672 | A1 | * | 5/2004 | Bastioli ................. C08J 5/18 525/450 |
| 2004/0248486 | A1 | * | 12/2004 | Hodson ................ B32B 27/36 442/79 |
| 2005/0137356 | A1 | * | 6/2005 | Hale ..................... C08L 67/04 525/421 |
| 2005/0154114 | A1 | * | 7/2005 | Hale ..................... C08J 5/18 524/436 |
| 2008/0050603 | A1 | * | 2/2008 | Randall ................ C08G 63/912 428/480 |
| 2008/0281018 | A1 | * | 11/2008 | Seeliger ............... C08L 67/02 523/124 |
| 2010/0323196 | A1 | | 12/2010 | Dou |
| 2010/0330382 | A1 | | 12/2010 | Dou |
| 2012/0259028 | A1 | * | 10/2012 | Plimmer ................ C08J 3/24 521/134 |
| 2014/0147604 | A1 | * | 5/2014 | Nevalainen .......... B32B 27/36 525/186 |
| 2016/0152824 | A1 | * | 6/2016 | Coupin ................. C08L 47/00 264/177.1 |

FOREIGN PATENT DOCUMENTS

| | | |
|---|---|---|
| WO | 2002/100921 A | 12/2002 |
| WO | 2006/002372 A | 1/2006 |
| WO | 2010/199944 A | 2/2010 |

* cited by examiner

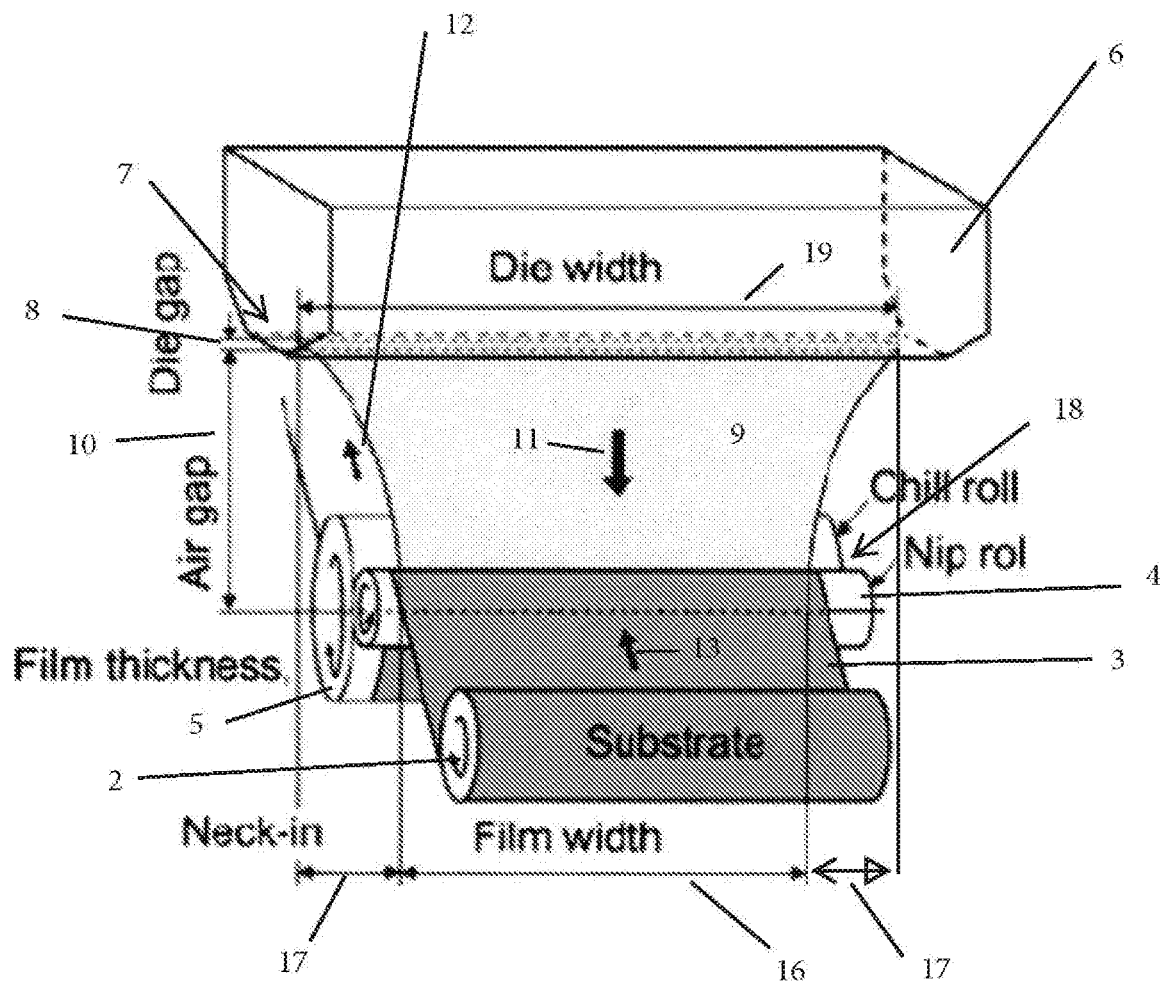

POLYLACTIC RESIN COMPOSITIONS FOR PAPERBOARD COATING AND PAPERBOARD COATING PROCESSES USING THE COMPOSITIONS

CROSS-REFERENCE TO RELATED APPLICATIONS

Not applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A READ-ONLY OPTICAL DISC OR AS A TEXT FILE VIA THE OFFICE ELECTRONIC FILING SYSTEM

Not Applicable.

STATEMENT REGARDING PRIOR DISCLOSURES BY THE INVENTOR OR A JOINT INVENTOR

Not applicable.

BACKGROUND OF THE INVENTION

Field of the Invention

This invention relates to polylactide compositions useful for paperboard coating and other applications, and to methods for using the polylactide compositions.

Description of Related Prior Art

Coated paperboard products are used widely in the food packaging and food service industries. The coating is generally a polymeric material that serves to protect the underlying paperboard from moisture. In drinking cups, the polymer coating forms a barrier that prevents the liquid in the cup, and in some cases condensation that forms on the outside of the cup, from contacting the paperboard. The paperboard has very little strength once it becomes saturated with water.

Coated paperboard is produced industrially in a melt extrusion process. The polymer is melted and extruded through a slit die positioned above the substrate, which is oriented horizontally. The extrudate falls from the die, forming a "melt curtain" that contacts and coats a surface of the substrate as the substrate is pulled through the coating station. The thus-coated paperboard is then pulled through one or more sets of nip and/or chill rollers to promote adhesion between the layers and further cool the coating material.

The slit die gap is greater than the coating thickness. Therefore, the melt curtain must be thinned, typically to one-tenth to one-eightieth of the die gap, as the extrudate falls from the die to the substrate. This is accomplished in large part by adjusting the "air gap", i.e., the vertical distance between the die and the substrate, and the line speed, i.e., the rate at which the substrate is pulled through the coating station.

Operating speeds are limited by the ability of the extrudate to draw down to the necessary thickness. Resins that lack sufficient melt strength exhibit excessive "neck-in", in which the width of the melt curtain becomes smaller as it falls from the die to the substrate. Another problem, also associated with inadequate melt strength, is "edge-weave", which is a cyclic pulsation in the dimensions of the melt curtain. Both of these problems lead to gauge variations in the applied coating and uneven coverage along the edges of the substrate. These also compromise the adhesion of the coating to the substrate. All of these problems lead to significant yield losses. They are avoided industrially by limiting line speeds, which reduces productivity and increases costs.

Linear polylactide resins are known to have lower melt strengths under low shear conditions than other polymers (such as polyethylene) that are used in this application. This characteristic limits their use in making coated paperboard products, where low production costs associated with high line speeds are critical.

Another problem with polylactide resins is the small window of operating temperatures that can be used. Polylactide resins melt at approximately 160-175° C., so the temperature must be greater than that when the melt curtain comes into contact with the substrate, or else adhesion becomes very poor. Unlike polyolefins, which tend to oxidize at the interface of the melt curtain and the surrounding atmosphere to form functional groups that bond the coating to the substrate, the adhesion of a polylactide to the substrate is mainly mechanical in nature, being attributable in large part to the ability of the heat-softened material to penetrate into the surface of the substrate. This penetration is favored when the material viscosity is lower. This consideration favors using a higher melt temperature.

On the other hand, melt temperatures are limited because polylactide resins undergo a rapid thermal degradation at typical processing temperatures. The viscosity of a polyolefin melt can be reduced by increasing melt temperatures to 300° C. or greater, but that approach to viscosity reduction is not possible with polylactide resins due to the thermal degradation that takes place even at significantly lower temperatures.

All of these factors lead to a narrow temperature window when polylactide resins are processed in a melt coating operation. The problem is made yet more difficult because polylactide resins exhibit a steeper viscosity increase with falling temperature than do polyolefins. The viscosity of the resin increases rapidly even as it cools within the melt curtain, if too much cooling takes place.

Melt strength can be increased by branching the polylactide resin. Various branching methods have been described before. These include, for example, copolymerizing lactide with an epoxidized fat or oil, as described in U.S. Pat. No. 5,359,206 or with a bicyclic lactone comonomer as described in WO 2002/100921A. Polylactide resins have been treated with peroxide, as described in U.S. Pat. Nos. 5,594,095 and 5,789,435, and polyfunctional initiators have been used in lactide polymerization processes, as described in U.S. Pat. Nos. 5,210,108 and 5,225,521, GB 2277324 and EP 632 081. All of these approaches have proved to be inadequate for various reasons. In some cases, melt strength is not increased sufficiently. In others, adequate melt strength is obtained but the resin viscosity increases to unworkable levels. These viscosity increases have an adverse effect on adhesion and line speeds.

Epoxy-functional acrylate polymers have been used to branch polylactide resins, as described in WO 2006/002372. These epoxy-functional polymers have equivalent weights of up to about 700. This approach has the benefits of allowing easy control of branching, and of adding the branching agent in a masterbatch. However, this approach has not proved beneficial for paperboard coating applications, because viscosities are too high.

BRIEF SUMMARY OF THE INVENTION

The invention is in one aspect a method for making a modified polylactide composition, comprising the steps of
I. forming a reaction mixture by combining:
 i) 85 to 99.9 weight percent, based on the combined weight of components i) and ii), of a starting linear polylactide resin or mixture of linear polylactide resins wherein the starting linear polylactide resin or mixture of linear polylactide resins has a relative viscosity of 2 to 4.5, the ratio of L-lactic acid repeating units to D-lactic acid repeating units in the starting linear polylactide resin or mixture of linear polylactide resins is >8:92 and <92:8 and the starting linear polylactide or mixture of linear polylactide resins contains carboxyl end groups and
 ii) 15 to 0.1 weight percent, based on the combined weight of components i) and ii), of a thermoplastic epoxy group-containing polymer having an epoxy equivalent weight of 1000 to 6000, an average of at least three epoxy groups per molecule, a melting temperature of 100° C. or lower and a glass transition temperature of 0° C. or lower;
II. reacting a portion of the carboxyl groups of the starting linear polylactide resin or mixture of linear polylactide resins with a portion of the epoxy groups of the thermoplastic epoxy group-containing polymer to form a composition that includes a reaction product of components i) and ii) and a quantity of unreacted component i) and
III. before, during and/or after step II, melt-blending the reaction mixture or composition formed in step II with iii) at least one branched polyester, wherein the at least one branched polyester has a glass transition temperature of 0° C. or lower and constitutes 1 to 60 weight percent of the combined weights of components i), ii) and iii).

The invention is also a modified polylactide composition made in accordance with the foregoing method.

In specific embodiments, the process includes the further step of blending the modified polylactide composition with at least one additional linear polylactide resin to form a diluted modified polylactide composition. The invention therefore in another aspect is a diluted modified polylactide composition made in accordance with such embodiments of the method of the invention.

The invention is also a modified polylactide composition comprising:
 a) a reaction product of:
 i) a starting linear polylactide resin or mixture of linear polylactide resins wherein the starting linear polylactide resin or mixture of linear polylactide resins has a relative viscosity of 2 to 4.5, the ratio of L-lactic acid repeating units to D-lactic acid repeating units in the starting linear polylactide resin or mixture of linear polylactide resins is >8:92 and <92:8 and the starting linear polylactide or mixture of linear polylactide resins contains carboxyl end groups, with
 ii) a thermoplastic epoxy group-containing polymer having an epoxy equivalent weight of 1000 to 6000, an average of at least three epoxy groups per molecule, a melting temperature of 100° C. or lower and a glass transition temperature of 0° C. or lower;
 b) at least one partially branched polyester having a glass transition temperature of 0° C. or lower; and
 c) a linear polylactide resin or mixture of linear polylactide resins.

In still another aspect, this invention is an article comprising a substrate having coated on at least one surface thereof a modified polylactide composition or diluted modified polylactide composition of the invention.

The invention is also a process for making a coated substrate, comprising
 a) melt extruding a modified polylactide composition or a diluted modified polylactide composition of the invention through a slit die to form a melt curtain, which melt curtain travels downward from the slit die toward a substrate to be coated;
 b) contacting the melt curtain with at least one surface of the substrate to form a coated substrate having a layer of the modified polylactide composition or diluted modified polylactide composition on at least one surface thereof and
 c) quenching the coated substrate to cool the layer of the modified polylactide composition or diluted modified polylactide composition to below 50° C.

The invention offers several important advantages. The melt strength of the modified polylactide compositions of the invention at low shear conditions (in particular 1 radian/s or lower) is remarkably higher than that of polylactide resin by itself. In coating applications, this leads to a large decrease in neck-in, which in turn permits high draw-downs and high operating line speeds. This increased melt strength is obtained without unduly increasing melt viscosity (and often even reducing melt viscosity) when the melt is under low shear conditions. The lower viscosities contribute to good adhesion to a substrate when the modified polylactide composition is applied as a coating layer in a melt coating process. The modified polylactide compositions of the invention also exhibit pronounced shear-thinning behavior.

Another very significant advantage is that the modified polylactide composition of the invention can be made and used in a highly manageable reactive extrusion process. The modified polylactide composition can be made in-line if desired, as part of a coating or other melt-processing operation. The invention also lends itself to masterbatching, in which a somewhat concentrated modified polylactide composition if formed, which is conveniently let-down with additional polylactide resin during the coating or other melt-processing operations. The ability to masterbatch provides yet an additional simplification of its use in melt-processing operations.

BRIEF DESCRIPTION OF THE SEVERAL VIEWS OF THE DRAWINGS

The FIGURE is a schematic diagram of an application station for applying the modified polylactide composition of the invention onto a substrate.

DETAILED DESCRIPTION OF THE INVENTION

The starting materials for making the modified polylactide composition of the invention include one or more linear polylactide resins (component i)), a certain thermoplastic epoxy group-containing polymer (component ii)) and at least one partially branched polyester (component iii)), all as described more fully below.

For the purposes of this invention, a "polylactide resin" is a polymer of lactide having repeating units of the structure —OC(=O)CH(CH$_3$)— ("lactic units"). The polylactide resin contains at least 90% by weight of such lactic units, and preferably contains at least 95% or at least 98% by weight of lactic units.

The polylactide resin may contain minor amounts, such as up to 10%, preferably up to 5% and more preferably up to 2% by weight, of residues of an initiator compound and/or repeating units derived from other monomers that are copolymerizable with lactide. Suitable such initiators include, for example, water, alcohols, glycol ethers, and polyhydroxy compounds of various types (such as ethylene glycol, propylene glycol, polyethylene glycol, polypropylene glycol, glycerine, trimethylolpropane, pentaerythritol, hydroxyl-terminated butadiene polymers and the like). Examples of copolymerizable monomers include glycolic acid, 2-hydroxybutyric acid and other α-hydroxyacids which can condense with lactic acid and generate cyclic diester impurities in lactide; alkylene oxides (including ethylene oxide, propylene oxide, butylene oxide, tetramethylene oxide, and the like); cyclic lactones; or cyclic carbonates. The polylactide resin(s) most preferably essentially devoid of such repeating units derived from other monomers.

By "linear" it is meant that the polylactide resin or mixture of polylactide resins has a branching number $B_n$ of no greater than 2.1 long-chain branches per 1000 carbon atoms, as determined using a gel permeation chromatograph equipped with a triple detector (light scattering, viscometer, refractive index detector). Long-chain branches have 6 or more carbon atoms.

The polylactide resins(s) can be prepared by polymerizing lactide in the presence of a polymerization catalyst as described in, for example, U.S. Pat. Nos. 5,247,059, 5,258, 488 and 5,274,073. This preferred polymerization process typically includes a devolatilization step during which the free lactide content of the polymer is reduced, preferably to less than 1% by weight, more preferably less than 0.5% by weight and especially less than 0.2% by weight. The polymerization catalyst is preferably deactivated or removed from the polylactide resin.

The polylactide resin or mixture of polylactide resin(s) may have a relative viscosity of 2.0 to 4.5, measured as described below.

The polylactide resin(s) may include virgin materials and/or recycled post-industrial or post-consumer polylactide resin(s).

The starting linear polylactide resin or mixture of linear polylactide resins has a relative viscosity of 2 to 4.5. The relative viscosity is preferably at least 2.5 or at least 2.75 and is preferably up to 4, up to 3.75 or up to 3.5. Relative viscosity is the ratio of the viscosity of a 1% wt/vol solution of the polylactide resin in chloroform to that of a chloroform standard, as measured using a capillary viscometer at 30° C.

Lactic units contain a chiral carbon atom and therefore exist in two enantiomeric forms, the "L" (or "S") enantiomer and the "D" (or "R") enantiomer. The ratio of L-lactic repeating units to D-lactic repeating units in the starting linear polylactide resin or mixture of linear polylactide resins is >8:92 and <92:8. This ratio may be ≥10:90 and ≤90:10 and may be ≥12:88 and ≤88:12.

At least a portion of the end groups of the linear polylactide resin(s) used to make the modified resin are carboxyl groups. At least 50% or at least 55% of the end groups may be carboxyl groups. Up to 80% up to 70 or up to 65% of the end groups may be carboxyl. When more than 50% of the end groups are carboxyl, a portion of the molecules of the linear polylactide resin(s) used to make the modified resin have two terminal carboxyl groups and no terminal hydroxyl groups. The remaining portion of the linear polylactide molecules preferably will include molecules having one hydroxyl terminal group and one carboxyl terminal group. Preferably, fewer than 5 weight-%, more preferably fewer than 1 weight-%, of the molecules of the linear polylactide resin used to make the modified resin lack a carboxyl end group.

The linear polylactide resin or mixture of linear polylactide resins may contain, for example, at least 1 weight-%, at least 2-weight-% or at least 3 weight-% of molecules having only terminal carboxyl groups, and may contain, for example, up to 80 weight-%, up to 50 weight-%, up to 30 weight-%, up to 20 weight-%, up to 10 weight-% or up to 8% of molecules having only terminal carboxyl groups.

The thermoplastic epoxy group-containing polymer ii) may have an epoxy equivalent weight of at least 1000 or at least 1500, up to 6000, up to 5000, up to 4000 or up to 3500. It has a number average of at least three epoxy groups per molecule, and may have up to 50, up to 30 or up to 20 epoxy groups per molecule. It may have a number average molecular weight (by gel permeation chromatography against polystyrene standards) of, for example, at least 3500, at least 10,000 or at least 20,000, up to 150,000, up to 135,000, up to 100,000 or up to 75,000. It may have a melt flow index of 2 to 20 or 5 to 15 g/10 minutes as measured according to ASTM D1238 condition 190° C./2.16 kg. It has a melting temperature of 100° C. or lower and a glass transition temperature of 0° C. or lower, preferably −20° C. or lower. All glass transition temperatures mentioned herein are measured by differential scanning calorimetry per ASTM D-1356-03.

Suitable thermoplastic epoxy group-containing polymers ii) include ethylene/glycidyl methacrylate copolymers as described in US 2009-0191371A. Commercially available products that are useful include Biomax® Strong BS 100 resin and Biomax® Strong BS120 resin, both available from DuPont, as well as Lotader® AX8900 resin, available from Arkema.

The branched polyester (component iii)) is characterized in having a glass transition temperature of 0° C. or lower. This polyester preferably has a glass transition temperature of −20° C. or lower. It is a room temperature (23° C.) solid and may be amorphous or semi-crystalline. If semi-crystalline, it preferably has a crystalline melting temperature of no greater than 120° C., more preferably no greater than 100° C. and still more preferably from 40 to 80° C. It may have a melt flow index of, for example 0.25 to 20 g/10 minutes, especially 0.5 to 12 g/minutes measured according to ASTM D1238 condition 190° C., 2.16 kg. It may be linear or branched.

In some embodiments, up to 50% of the end groups of the polyester b) are carboxyl. For example 0 to 50%, 0 to 30%, 0 to 25% or 0 to 10% of the end groups may be carboxyl. The remaining end groups may be hydroxyl, for example, or may be other end groups that are not reactive towards epoxide groups.

The branched polyester may be, for example, a polycaprolactone; a poly(3-hydroxyalkanoate) such as a poly(3-hydroxyvalerate) or a poly(3-hydroxybutyrate-co-3-hydroxyvalerate), a poly(ethylene succinate), a poly(1,4-butylenesuccinate), a poly(1,4-butylene adipate); a poly (ethylene adipate), a polybutylene succinate-adipate, a poly(neopentyl glycol succinate), poly(tetramethylene sebecate), and the like. Polycaprolactone is a preferred polyester b).

Modified polylactide compositions of the invention are conveniently made by forming a reaction mixture by combining components i) and ii). These are reacted to form a composition that includes a reaction product of components i) and ii) as well as unreacted component i). At least one partially branched polyester is melt-blended with that composition. This can be done before, during or after the reaction step, as described more fully below.

The reaction mixture contains 85 to 99.9 parts by weight of component i) and correspondingly 15 to 0.1 parts by weight of component ii), based on their combined weights. In some embodiments, component i) constitutes 85 to 98%, 90 to 97% or 92 to 96% of the combined weights of components i) and ii).

The thermoplastic epoxy group-containing polymer ii) may be provided in an amount sufficient to provide at least 1 epoxy group per carboxyl group provided by the linear polylactide resin(s). It may be provided in an amount to provide a ratio of epoxy groups to carboxyl groups of at least 1.1, at least 1.2 or at least 1.25. That ratio may be, for example, up to 10, up to 5, up to 3, up to 2 or up to 1.5.

The reaction of components i) and ii) may be continued until at least 10%, at least 15% at least 18%, or at least 20% of the carboxyl groups provided by the linear polylactide resin or mixture of linear polylactide resins are consumed by reaction with epoxide groups. Up to 90%, up to 80%, up to 70%, up to 60%, up to 50%, up to 40% or up to 30% of the carboxyl groups may be consumed. When fewer than 100% of the carboxyl group are consumed, the reaction product generally will contain some quantity of unreacted linear polylactide resin. It is believed that little reaction takes place between the epoxide groups and hydroxyl groups of the polylactide resin(s).

Generally, a small proportion of the epoxide groups provided by the thermoplastic epoxy group-containing polymer are consumed. For example, at least 2%, at least 5%, at least 8% or at least 10%, and up to 50%, up to 35%, up to 25%, up to 20% or up to 15% of the epoxide groups may be consumed.

The reaction of components i) and ii) preferably is performed in the melt and under shear. A preferred temperature of the melt is 185° C. to 240° C. The reaction of components i) and ii) tends to proceed very slowly at temperatures below 185° C. At above 240° C., the polylactide resins begin to degrade somewhat rapidly. A preferred temperature is 205° C. to 225° C. This temperature range provides a good balance of reactivity with little degradation of the polylactide resin.

It is noted that these temperatures pertain to the temperature of the molten reaction mixture itself, as may be measured, for example, by means of a temperature probe inserted into the molten reaction mixture. External jacket temperatures of the reaction vessel (including barrel temperatures in the case where the reaction is performed in an extruder) may not reflect the temperature of the molten reaction mixture, which may be at a somewhat different (and often higher) temperature due to heat generated by the mechanical action of mixing elements (such as extruder screws) inside the reaction vessel.

It is preferred to minimize the time at which the reaction mixture is exposed to such reaction temperatures, in order to prevent over-reaction of components i) and ii) (which can cause gelling or very large viscosity increase as well as excessive degradation of the polylactide resin(s). A time period of 30 seconds to 5 minutes is suitable. Preferred time periods are 1 to 3.5 minutes, 1 to 3 minutes or 1 to 2.5 minutes. After completion of such time periods, the resulting composition preferably is cooled to a temperature below 185° C. to avoid further reaction and/or degradation.

The reaction preferably is performed under shearing conditions at a shear rate of at least $100 \ s^{-1}$.

The reaction of components i) and ii) may be performed in any device that is capable of delivering the required temperature, time and shear conditions. A Brabender mixer or, more preferably, a twin-screw extruder, are suitable devices.

The reaction mixture may be formed and reacted by feeding the linear polylactide resin(s) i) and thermoplastic epoxy group-containing polymer ii) into a twin-screw extruder where they are melted, mixed and brought to the reaction temperature at least partially through mechanically generated heat formed by operating the extruder screws. Further temperature control can be provided by controlling the extruder jacket temperature. The reaction time is measured from the point at which the molten mixture of materials reaches the aforementioned reaction temperatures, until they are cooled to below 185° C.

The process may be performed, for example, by introducing the polylactide resin(s) into an upstream section of an extruder barrel, melting the resin(s) and bringing them to reaction temperature. Component ii) is introduced in a downstream section of the extruder barrel where it is mixed with the polylactide resin(s) that are already at reaction temperature. A small temperature drop may be seen at the point of mixing, but this is generally small because the relative proportion of component ii) is small. If the temperature of the mixture drops below the reaction temperature at this point, the reaction temperature is recovered rapidly. Thereafter, the mixture of components i) and ii) is subjected to the foregoing conditions of temperature and shear, for a time period as indicated before. After the requisite reaction time, the mixture is cooled to below 185° C. by, for example, withdrawing it from the extruder and/or by passing it though one or more cooling zones.

The branched polyester iii) can be combined with the other components before, during and/or after the foregoing reaction step. In the preferred reactive extrusion process described above, the branched polyester may be introduced into an extruder section that is downstream of the points at which components i) and ii) are introduced. Component iii) may be introduced within or downstream of the reaction zone, i.e., the portion of the extruder in which the mixture of components i) and ii) are subjected to reaction conditions (temperature, shear) as described before.

In a particular embodiment, component iii) is introduced within the reaction zone. In such an embodiment, the reaction of components i) and ii) begins before component iii) is introduced and continues afterward.

Alternatively, component iii) can be introduced downstream of the reaction zone or upstream of the reaction zone. In the latter case, component iii) is present at the start of the reaction between components i) and ii). Component iii) is therefore introduced into the extruder at the same point or upstream of the point at which one or both of components i) and ii) are introduced.

Component iii) may constitute at least 1%, at least 2%, at least 5%, at least 10%, at least 20%, at least 25% or at least 30% of the combined weights of components i), ii) and iii)). It may constitute up to 60%, up to 55%, or up to 50% of the combined weights of components i), ii) and iii).

The resulting modified polylactide composition may be extruded through a suitable die to make, for example, an extruded part or strands that are subsequently pelletized or flaked for use in a subsequent melt-processing operation.

The modified polylactide composition of the invention contains a) a reaction product of components i) and ii), b) the at least one branched polyester and c) a linear polylactide resin or mixture of linear polylactide resins. It is believed that little if any reaction takes place between components ii) and iii).

The reaction product of components i) and ii) can include species of various types, including 1) adducts of a single polylactide resin molecule with a single molecule of the epoxy group-containing polymer; 2) adducts of two or more polylactide resin molecules with a single molecule of the epoxy group-containing polymer and 3) adducts of one or more polylactide resin molecules with two or more molecules of the epoxy group-containing polymer. Case 2) represents a coupling or branching of polylactide molecules and case 3) represents a coupling of the epoxy group-containing polymer (with or without further branching). The production of the last type (case 3) is favored when the starting polylactide resin includes at least some molecules that have two carboxyl groups. The modified resin may include species of all three of the foregoing types.

The reaction product preferably contains little or no crosslinked material and therefore remains thermoplastic, i.e., melt-processable, at elevated temperature. Preferably less than 5% (especially less than 1%) by weight of the modified polylactide composition is in the form of gels, i.e., reaction products that are infusible and/or insoluble in a solvent for both the starting polylactide resin(s) and the thermoplastic epoxy group-containing polymer. The presence of insoluble reaction products can be determined using light scattering methods on a solution or dispersion of the modified resin (or a diluted polyester blend of the invention), and/or by filtering a melt of the modified resin (or a diluted polyester blend).

The modified polylactide composition of this invention may include, for example, a) 0.1 to 80 weight percent, of the reaction product of components i) and ii), b) 1 to 60 weight percent of the at least one polyester having a glass transition temperature of 0° C. or lower; and c) 0 to 98.9 weight percent of a linear polylactide resin or mixture of linear polylactide resins, wherein the ratio of L-lactic repeating units to D-lactic repeating units in the linear polylactide resin or mixture of linear polylactide resins is >8:92 and <92:8. Here and elsewhere in this specification, unless otherwise indicated, the weight percentages of these components are based on their combined weight.

In some embodiments, the modified polylactide composition contains 0.1 to 80 weight percent of component a), 1 to 60 weight percent of component b) and 10 to 98.9 weight percent of component c), based on the combined weights of components a), b) and c). In other specific embodiments, the modified polylactide composition contains 2 to 80 weight percent of component a), 20 to 60 weight percent of component b) and 10 to 76 weight percent of component c), based on the combined weights of components a), b) and c).

In other specific embodiments, the modified polylactide composition contains 4 to 56 weight percent of component a), 20 to 60 weight percent of component b) and 12 to 72 weight percent of component c), based on the combined weights of components a), b) and c). In still other specific embodiments, the modified polylactide composition contains 6 to 36 weight percent of component a), 20 to 60 weight percent of component b) and 20 to 68 weight percent of component c), based on the combined weights of components a), b) and c). In yet other specific embodiments, the modified polylactide composition contains 8 to 24 weight percent of component a), 20 to 60 weight percent of component b) and 28 to 64 weight percent of component c), based on the combined weights of components a), b) and c).

Modified polylactide compositions as described in the preceding paragraph have somewhat high concentrations of component a). These can be used as described, but in preferred embodiments are diluted (or "let-down") by combining them, preferably by melt blending, with more of a polylactide resin as described to form a diluted or let-down composition that is in turn used in various end-use melt-processing applications. Processes such as this for forming a concentrate that is to be subsequently diluted or let-down are commonly referred to as "masterbatching" processes.

In connection with this invention, masterbatching to produce a modified polylactide composition somewhat rich in component a) provides several advantages, including using a smaller amount of polylactide resin(s) in the reaction step. This allows smaller volumes of material to be processed under reaction conditions, thereby reducing production; allows for better control of temperature and residence time; and reduces the thermal degradation of the polylactide resin because a portion of that resin is removed from the thermal conditions of the reaction process. In addition, a single masterbatched material rich in component a) can be diluted at various let-down ratios to produce a variety of diluted modified polylactide compositions as may be wanted to produce different products. Still another advantage is that the dilution step can be performed under less stringent conditions, in particular at lower shear, and thus can be performed using a wider variety of types of equipment, such as a single-screw extruder. The dilution step can be incorporated into a melt-processing step for forming the modified polylactide composition into a downstream product.

A masterbatched composition as described above may be let down at a ratio, for example, of 5 to 30 parts by weight of the masterbatched composition and correspondingly 95 to 70 parts by weight of the additional polylactide resin(s). Such a let-down modified polylactide composition is sometimes referred to herein as a "diluted" modified polylactide composition. A masterbatched composition may alternatively be let-down with one or more other thermoplastic polymers, or a mixture of one or more other thermoplastic polymers and one or more polylactide resins, with ratios as indicated above being suitable.

In other embodiments, the modified polylactide composition contains 0.1 to 24 weight percent of component a), 1 to 18 weight percent of component b) and 70 to 98.9 weight percent of component c), based on the combined weights of components a), b) and c). In still other embodiments, the modified polylactide composition contains 0.2 to 12 weight percent of component a), 1 to 18 weight percent of component b) and 76 to 98.6 weight percent of component c), based on the combined weights of components a), b) and c). In yet other embodiments, the modified polylactide composition contains 0.4 to 7.2 weight percent of component a), 1 to 18 weight percent of component b) and 78.4 to 98.2 weight percent of component c), based on the combined weights of components a), b) and c). Embodiments as are described in this paragraph can be made directly in the manner described above, or can be made by making a masterbatched modified polylactide composition that is richer in component a) and letting it down with more polylactide resin (forming, in the latter case, a "diluted" modified polylactide composition).

The modified polylactide composition of the invention is a thermoplastic resin composition that is useful by itself (i.e., without blending with any other polymer) for making melt-processed articles by extrusion, injection molding, compression molding, stretch injection molding, blow molding and the like. It can be used by itself as a coating for paperboard or other substrates.

The modified polylactide composition of the invention is particularly useful for making coated substrates in a melt extrusion coating process, due in part to its desirable combination of high melt strength (particularly when under low shear conditions such as 1 radian/s or lower) and shear-thinning behavior. Compared with neat polylactide resins, the modified polylactide composition of the invention exhibits greater adhesion to substrates, particularly paperboard, and reduced neck-in and draw resonance (edge weave). These advantages are especially pronounced at low coating weights. Low coating weights generally require high line speeds, so the ability to achieve these benefits at low coating weight permits higher speed line operation. High line speeds often correlate to high draw-down ratios. The excellent melt strength of the modified polylactide composition greatly facilitates coating operations at these high draw-down ratios.

The FIGURE is a schematic diagram of an application station for applying the modified polylactide composition of the invention onto a substrate. The application station is generally a part of a larger apparatus that may include, for example, apparatus for holding, tensioning and feeding a rollstock or other substrate; various pretreatment and/or post-treatment apparatus such as ozone treatment apparatus, substrate pre-heating apparatus, one or more additional coating stations at which, for example, a second coating layer is applied to a surface of the substrate and/or a coating layer may be applied to the opposite surface of the substrate; means for supplying and marrying a second substrate layer atop the modified polylactide composition coating to produce a laminate; apparatus for feeding heat-softened modified polylactide composition to a slit die; apparatus for trimming or otherwise cutting the coated substrate; apparatus for moving the substrate through the process; apparatus for rolling or otherwise packaging the coated substrate; various metering devices and process control devices; apparatus for supplying a chilled liquid to a chill roll, and the like.

Melt extrusion coating apparatus such as is described, for example, in *A Guide to Polyolefin Extrusion Coating*, LyondellBasell publication no. 6665/0715 (2015), is entirely suitable.

In the FIGURE, the heat-softened modified polylactide composition is supplied to slit die 6, typically via an extruder (not shown) or other apparatus that feeds the heat-softened polyester blend to slit die 6.

The heat-softened modified polylactide composition preferably is a "diluted" modified polylactide composition as described before. The modified polylactide composition may be formed separately or its production integrated into the coating process as an upstream step. In preferred embodiments, a modified polylactide composition rich in component a) is let down with additional polylactide resin in an upstream step of the coating process, such as in an upstream single- or twin-screw extruder that directly or indirectly feeds slit die 6, to form a diluted modified polylactide composition which is then used to form the coating.

The temperature of the modified polylactide composition at slit die 6 may be, for example 180° C. to 270° C., with a preferred temperature range being 210° C. to 260° C. and a more preferred temperature range being 225° C. to 245° C. Higher temperatures can lead to thermal degradation of the polylactide resin(s). Lower temperatures lead to poor adhesion and other processing difficulties.

Slit die 6 includes elongated slit opening 7. Slit opening 7 is generally oriented horizontally with its length (longest dimension) transverse to the direction of travel of substrate 3, as indicated by arrow 13. Slit opening 7 has a width 8 which is the "die gap" and sets the thickness of film curtain 9 of the polyester blend as it exits slit die 6. Die gap 8 may be, for example, at least 0.15 mm, at least 0.25 mm or at least 0.30 mm and may be, for example, up to 2.5 mm, up to 1.5 mm, up to 1 mm, up to 0.85 mm or up to 0.70 mm.

Substrate 3 is continuously pulled through a coating zone 18 located below slit die 6, such that film curtain 9 falls in the direction indicated by arrow 11 onto substrate 3 and forms a coating. As shown, substrate 3 is fed from roll 2, over nip roll 4 and chill roll 5. Nip roll 4 and/or chill roll 5 may be driven and thus may provide the necessary force to pull substrate 3 through coating zone 18. Alternatively or in addition, various drive mechanisms may be located downstream (i.e., in the direction of travel of substrate 3), which mechanisms pull substrate 3 through coating zone 18 (and the rest of the process).

Because coating zone 18 is located below slit die 6, film curtain 9 must fall downward through the atmosphere from slit opening 7 into coating zone 18, where it contacts substrate 3 and forms a coating thereon. Pressure is then applied to the coated substrate 3 to marry the layers together and promote good adhesion, and the coating is cooled ("quenched") to below its glass transition temperature, preferably to 50° C. or below. These steps can be performed sequentially (application of pressure followed by cooling) or simultaneously. In the embodiment shown in the FIGURE, pressure is applied by passing the coated substrate 3 between nip roll 4 and chill roll 5.

The applied pressure may be, for example 101 to 2020 kPa actual, preferably 202 to 1010 kPa actual. Chill roll 5 may be maintained at a temperature of, for example 5 to 50° C., with a preferred range being 10 to 35° C. or 15 to 25° C.

The vertical distance between slit opening 7 and the point of contact with substrate 3 is known as the "air gap", which is indicated in the FIGURE by reference numeral 10. The air gap preferably is as small as possible consistent with geometrical constraints imposed by the design of the equipment (in particular the chill roll diameter), so cooling is minimized in the melt curtain and the viscosity of the coating material does not increase excessively before coming into contact with the substrate. The air gap may be, for example, 50 mm to 200 mm, with an air gap of 50 mm to 150 mm and especially 75 mm to 125 mm or 75 mm to 100 mm being preferred.

The temperature of the atmosphere through which film curtain 9 falls may be maintained at the ambient temperature of the production facility. If desired, localized heating may be provided to reduce temperature loss and viscosity increase through the air gap.

The temperature of the modified polylactide composition falls as film curtain 9 falls through air gap 10. This causes a viscosity increase. The temperature of the polyester blend at the point film curtain 9 contacts substrate 3 preferably is at least 160° C., at least 175° C., at least 190° C. or at least 200° C. The temperature of the melt curtain can be measured, for example, using infrared thermal imaging methods.

Film curtain 9 draws down to become much thinner as it passes through the air gap to form a coating on the substrate. The drawing effect is due in part to the effect of gravity and in part due to the film curtain 9 adhering to the traveling substrate 3 in coating zone 18. The movement of substrate 3 therefore pulls on film curtain 9 and draws it down. The extent of this drawing can be expressed as the draw ratio, i.e., the ratio of the die gap and the thickness of the applied coating. The draw ratio may be, for example as small as about 10 and as great as about 80. The invention has particular benefits when the coating process is operated at higher draw ratios, such as 40 to 80, 42 to 75 or 50 to 75.

The coating thickness may be, for example, at least 5 µm, at least 7.5 µm or at least 9 µm, and up to 40 µm, up to 30 µm, up to 25 µm, up to 20 µm, up to 15 µm, up to 13 µm or up to 12 µm. The coating weight may be, for example, at least 9 g/m$^2$ or at least 12 g/m$^2$ and up to 50 g/m$^2$, up to 40 g/m$^2$, up to 30 g/m$^2$, up to 25 g/m$^2$, up to 20 g/m$^2$, up to 18 g/m$^2$ or up to 15 g/m$^2$.

In addition, the width of film curtain 9 decreases, so the width of the applied coating (as indicated by reference numeral 16 in the FIGURE) is less than the length of slit opening 7 of slit die 6. This phenomenon is known as "neck-in".

"Neck-in" is equal to one half of the difference between the die length and the applied coating width. An advantage of this invention is neck-in is reduced, compared to an otherwise like case in which a neat linear polylactide resin is the coating material. This advantage becomes more prominent at higher draw ratios.

At higher draw ratios, a periodic variation in the amount of neck-in (or, equivalently, the width of the applied coating) is often experienced in melt extrusion coating processes. This is commonly referred to as "edge weave" and is disadvantageous because the substrate becomes coated unevenly along the opposing edges (aligned with the direction of movement of the substrate through the application station), which requires trimming or scrapping of the coated product. Another advantage of this invention is that edge weave is reduced, particularly at higher draw ratios, compared to when a neat linear polylactide resin is the coating material.

At industrial scale, line speed has a large effect on draw ratio, with higher line speeds correlating to higher draw ratios (other things being constant). "Line speed" refers to the linear rate of movement of the substrate through the application station. The line speed may be, for example, at least 50 meters per minute, but the advantages of the invention are best realized at higher line speeds, and therefore higher draw ratios. A preferred line speed is at least 80 meters per minute, at least 100 meters per minute, at least 120 meters per minute or at least 140 meters per minute. The line speed may be, for example, up to 400 meters per minute, up to 350 meters per minute, up to 300 meters per minute, up to 250 meters per minute, up to 200 meters per minute, up to 180 meters per minute or up to 160 meters per minute.

In some embodiments, the line speed is 100 to 350 meters per minute, the draw ratio is 40 to 80, the coating weight is 9 to 20 g/m$^2$ and the coating thickness is 5 to 15 µm. In other embodiments the line speed is 120 to 325 meters per minute, the draw ratio is 42 to 75, the coating weight is 12 to 20 g/m$^2$, and the coating thickness is 9 to 15 µm or 9 to 13 µm. In yet other embodiments the line speed is 150 to 325 meters per minute, the draw ratio is 50 to 75, the coating weight is 12 to 18 g/m$^2$ and the coating thickness is 9 to 12 µm.

The substrate may be, for example, a cellulosic material such as paperboard, paper, cardboard, a wood veneer, or other boardstock; a textile, which may be, for example, made up of woven, knitted, entangled and/or melt-bonded fibers; a polymeric film or sheet, which may be thermoplastic or thermoset material; a composite material; or any other material that is capable of being processed through the melt extrusion coating apparatus. Thin, flexible substrates that can be rolled without damage are preferred, and paper and paperboard are especially preferred.

Paperboard has an areal density of at least 224 g/m$^2$, whereas paper has a lower areal density. A paper or paperboard substrate may be, for example, a solid bleached sulfate type, an unbleached Kraft type, recycled paperboard which may or may not have a kaolin or other coating on at least one surface; and/or an MET-PET board. Calipers may be, for example, from 0.002 to 0.050 mils (50.8 to 1270 µm), especially 0.01 to 0.05 mils (254 to 1270 µm) as measured by ASTM D645-95.

In some embodiments, the modified polylactide composition coating thus applied forms an exposed layer in the final product. In such a case, the modified polylactide composition coating may impart moisture resistance to the coated substrate by forming a barrier against penetration of water (or other liquid) to the underlying substrate.

Such a coated substrate is of particular interest for making certain packaging materials, as well as in making disposable food service items such as drink cups. Coated substrates used in making such packaging materials and food service items may be coated on one or both sides with the modified polylactide composition. Paperboard for making cold food or cold beverage containers, for example, is typically coated on both sides, to protect the paperboard substrate from contact with the container contents on the inside surface as well as from condensation that forms on the outside surface.

The modified polylactide composition coating can form an adhesive layer between two substrates. In a melt extrusion process, the coating is formed onto one layer as described before and a second substrate layer is laid over the coating before it is quenched to form the assembly.

The following examples are provided to illustrate the invention, but not to limit the scope thereof. All parts and percentages are by weight unless otherwise indicated.

PLA A is a linear poly(lactide) having a relative viscosity of 3.5 and in which the ratio of L:D lactic units is 88:12. It is commercially available from NatureWorks LLC as Ingeo® 4060D PLA resin. About 50% of the end groups of PLA A are carboxyl. PLA A contains almost entirely PLA resin molecules having one carboxyl group and one hydroxyl group.

PLA B is a linear poly(lactide) having a relative viscosity of 3.3 and in which the ratio of L:D lactic units is 95.8:4.2. It is commercially available from NatureWorks LLC as Ingeo® 8052D PLA resin. About 55% of the end groups of PLA B are carboxyl. PLA B contains about 10 mole-% of molecules having 2 carboxyl groups and no hydroxyl groups, and 90 mole-% of molecules having one carboxyl and one hydroxyl group.

PLA C is a linear poly(lactide) having a relative viscosity of 3.0 and in which the ratio of L:D lactic units is 90:10. About 50% of the end groups of PLA A are carboxyl. PLA C contains almost entirely PLA resin molecules having one carboxyl group and one hydroxyl group.

TEGCP (thermoplastic epoxy group-containing polymer) A is an epoxy-group containing ethylene copolymer available commercially as Biomax® Strong 120 from DuPont Company. It has an epoxy equivalent weight of about 3400, a number average molecular weight of approximately 43,000 and a number average of approximately 13 epoxide groups per molecule.

TEGCP B is an epoxy-group containing copolymer available commercially as Joncryl® ADR 4368C from BASF. It has an epoxy equivalent weight of about 285, a number average molecular weight of 2508 g/mol and approximately 8.8 epoxide groups per molecule.

The PCL is a branched polycaprolactone sold commercially as Capa FB100 by Perstorp. This material has a melting temperature of 58-60° C., a glass transition temperature below 0° C. and a melt flow index of 2 g/10 minutes.

Modified Polylactide Compositions 1-3 and Comparative Blend A

Modified Polylactide Compositions 1-3 (MPCs 1-3, inventive) and Comparative Blend A are made in the following general manner:

The linear polylactide resin(s) and TEGCP are combined and melted together in a twin-screw extruder to form a melt having a temperature 210° C., where they react. The PCL is added at an injection port near the die end of the extruder, and melt-blended in. The residence time at 210° C. before the PCL addition is about 1.5 minutes and total residence time is about 2.5 minutes. Approximately 13% of the epoxide groups supplied by the TEGCP are consumed in this reaction. The extrudate exiting the die is chopped into pellets.

The formulations for the various blends are as follows:

| | Parts by Weight | | | |
|---|---|---|---|---|
| Ingredient | MPC 1 | MPC 2 | MPC 3 | Blend A |
| PLA A | 50 | 28 | 46.5 | 0 |
| PLA B | 16 | 18.5 | 0 | 12 |
| PLA C | 0 | 0 | 0 | 75 |
| TEGCP A | 3 | 3.75 | 3.75 | 0 |
| TEGCP B | 0 | 0 | 0 | 0.4 |
| PCL | 31 | 49.75 | 49.75 | 12 |

The much lower weight of TEGCP B in Blend A, compared to MPCs 1-3, compensates for its much lower epoxy equivalent weight. The number of epoxide equivalents provided into Blend A is comparable to Blends 1-3, to provide similar levels of branching.

Paperboard Coating Comparative Run A

A bleached paperboard designed for paper beverage cups, having a basis weight of 260 g/m$^2$ and a thickness of 370 µm, is coated with PLA A in a melt extrusion process. The PLA A is melted in a single screw extruder and transferred to a slit die having a slit opening 540 mm in length and an 630 µm die gap. The extruder speed is 80 rpm. Throughput is 1 kg/hour. The approximate melt temperature at the slit die is 250° C. The molten PLA A is forced through the slit die to form a film curtain that falls through an air gap of 127 mm onto the paperboard substrate. The thus-coated substrate is then immediately passed between a nip roll and a chill roll that is at a temperature of about 20° C. The nip roll and chill roll apply a pressure of about 515 kPa onto the coated substrate and cool the PLA coating to below 50° C.

The line speed is varied from 50 to 150 meters per minute. Coating weight, coating thickness and draw ratio are determined. Neck-in is calculated by measuring the width of the applied coating, subtracting the measured width from the length of the slit die (540 mm), and dividing by two.

After cooling the coated paperboard to room temperature, adhesion is evaluated subjectively. An X-shape is cut through a test sample using a knife. The coating layer is then peeled away from the paperboard substrate manually, and the underside of the peeled coating is inspected visually. Adhesion is rated on a scale of 1 to 5, with 5 being best and representing the case in which paperboard fibers are adhered to the entire section of peeled coating. A 1 represents the worst case in which no paperboard fibers remain adhered to the peeled coating. Multiple test specimens are evaluated in each case and the results averaged.

Results from this run are as indicated in Table 1.

TABLE 1

| Paperboard coating with neat PLA A | | | | | |
|---|---|---|---|---|---|
| Line Speed, m/min | Coating Weight, g/m$^2$ | Coating thickness, µm | Draw Ratio | Neck-in, mm | Adhesion |
| 50 | 41.8 | 33.4 | 19 | 78 | 5 |
| 60 | 33.4 | 26.7 | 24 | 81 | 5 |
| 70 | 27.7 | 22.1 | 29 | 86 | 5 |
| 80 | 25.1 | 20.1 | 31 | 93 | 5 |
| 100 | 23.5 | 18.8 | 34 | 102 | 5 |
| 120 | 17.6 | 14.1 | 45 | 107 | 4 |
| 150 | 13.1 | 10.5 | 60 | 120 | 3.5 |

As the data in Table 1 shows, neck-in increases with increasing line speed and draw ratio, and adhesion deteriorates significantly at draw ratios of 45 and greater.

Paperboard Examples 1-5

Comparative Run A is repeated, except this time PLA A is melt-blended with MPC 2 or MPC 3 at proportions indicated in Table 2. The ratios of PLA A and the various blends and results of the testing at line speeds of 120 and 150 meters per minute are indicated in Table 2. The results for Comparative Run A at those line speeds are repeated for convenience.

TABLE 2

| Designation | % PLAA | MPC/ Blend Type/% | Line Speed, m/min | Coating Weight, g/m$^2$ | Coating thickness, µm | Draw Ratio | Neck-in, mm | Adhesion |
|---|---|---|---|---|---|---|---|---|
| A* | 100 | 0 | 120 | 17.6 | 14.1 | 45 | 107 | 4 |
| A* | 100 | 0 | 150 | 13.1 | 10.5 | 60 | 120 | 3.5 |
| 1 | 80 | 2/20 | 120 | 18.1 | 14.5 | 44 | 94 | 5 |
| 1 | 80 | 2/20 | 150 | 13.9 | 11.1 | 57 | 99 | 4.5 |
| 2 | 85 | 2/15 | 120 | 17.5 | 14 | 45 | 96 | 5 |
| 2 | 85 | 2/15 | 150 | 14.7 | 11.8 | 53 | 108 | 5 |
| 3 | 90 | 2/10 | 120 | 16.8 | 13.5 | 47 | 105 | 4 |
| 3 | 90 | 2/10 | 150 | 14.8 | 11.8 | 53 | 107 | 4 |
| 4 | 80 | 3/20 | 120 | 14.7 | 11.8 | 53 | 96 | 5 |
| 4 | 80 | 3/20 | 150 | 13.9 | 11.1 | 57 | 102 | 5 |
| 5 | 85 | 3/15 | 120 | 17.6 | 14 | 45 | 102 | 5 |
| 5 | 85 | 3/15 | 150 | 15.1 | 12 | 52 | 104 | 5 |

*Not an example of the invention.

As shown in Table 2, Examples 1-4 all exhibit significantly reduced neck-in at both line speeds at which they are evaluated. Adhesion is improved significantly. This data demonstrates the suitability of the blends of PLA A and Blends 2 or 3 for extrusion coating at high line speeds and draw ratios of 44 up to at least 57.

Examples 6 and 7 and Comparative Runs B and C

Comparative Run B is performed by repeating Comparative Run A under the same general conditions as described above, at line speed of 105 m/min. Coating weight is controlled by varying through-put. The line speed, through-put, coating weight, coating thickness, draw ratio, neck-in and adhesion rating are as reported in Table 3 below.

Examples 6 and 7 are performed in the same general manner as Example 1 and Comparative Run B, using a blend of PLA-A and MPC 1. Results are as indicated in Table 3.

Comparative Run C is performed in the same manner as Example 6, except MPC 1 is replaced with Blend A. Results are as indicated in Table 3.

TABLE 3

| Designation | % PLAA | Blend Type/ % | Through-put, kg/hr | Coating Weight, g/m² | Coating thickness, μm | Draw Ratio | Neck-in, mm | Adhesion |
|---|---|---|---|---|---|---|---|---|
| B* | 100 | 0 | 106 | 24 | 19.05 | 27 | 69 | 4.5 |
| B* | 100 | 0 | 70.5 | 16 | 12.70 | 40 | 94 | 4 |
| 6 | 85 | 1/15 | 106 | 24 | 19.05 | 27 | 55 | 4.5 |
| 6 | | 1/15 | 70.5 | 26 | 12.70 | 40 | 59 | 4.5 |
| 7 | 92.5 | 1/7.5 | 106 | 24 | 19.05 | 27 | 57 | 5 |
| 7 | | 1/7.5 | 70.5 | 16 | 12.70 | 40 | 70 | 5 |
| C* | 85 | A/15 | 106 | 24 | 19.05 | 27 | 49 | 3 |

High neck-in is seen with Comparative Run B. Comparative Run C exhibits reduced neck-in compared to Comparative Run B, but adhesion is much worse, even at a low line speed and draw ratio. Examples 6 and 7 demonstrate very good to excellent adhesion and significantly reduced neck-in as compared to Comparative Run B, particularly at the higher draw ratio.

Rheology Evaluations

The complex viscosity, storage modulus (G'), loss modulus (G") and tan delta G"/G' values are measured for PLA A and various blends of PLA A with MPC 1, 2 or 3, at a temperature of 210° C. and shear rates of 0.4 rad/s and 100 rad/s. Measurements are made using a TA Instruments ARES parallel plate rheometer equipped with TA orchestrator software. Plate diameter is 25 mm and the gap is 1.3 mm. Tool inertia is 62.5 g-cm² and strain is 1.6% Results are as indicated in Table 4.

TABLE 4

| Wt.-% PLAA | MPC Type/ Wt.-% | Shear rate, rad/s | Complex Viscosity, Pa·s | G', Pa | G", Pa | Tan Delta |
|---|---|---|---|---|---|---|
| 100 | None | 0.4 | ~975 | | | >65 |
| | | 100 | 630 | 28,800 | 56100 | 1.95 |
| 92.5 | 1/7.5 | 0.4 | 795 | 5.9 | 317 | 53.8 |
| | | 100 | 526 | 22,500 | 47,500 | 2.1 |
| 80 | 2/20 | 0.4 | 898 | 20.1 | 357 | 18 |
| | | 100 | 495 | 22,700 | 44,000 | 1.94 |
| 85 | 2/15 | 0.4 | 918 | 18.3 | 365 | 20 |
| | | 100 | 518 | 23,900 | 45,900 | 1.92 |
| 90 | 2/10 | 0.4 | 891 | 13.7 | 354 | 26 |
| | | 100 | 518 | 23,800 | 46,000 | 1.93 |
| 80 | 3/20 | 0.4 | 1025 | 22 | 407 | 18.5 |
| | | 100 | 551 | 25,800 | 46,700 | 1.89 |

Unmodified PLA A exhibits a very high tan delta value at low shear. A high tan delta value correlates to poor melt strength. This data therefore indicates that PLA A by itself exhibits low melt strength when under low shear conditions, such as exist in a melt curtain of a melt coating process. By blending PLA with MPC 1, 2 or 3, large reductions in tan delta are seen, which indicate corresponding improvements in melt strength.

The improvement in melt strength is achieved without a significant increase in viscosity at low shear. This is an important feature of this invention. Low shear viscosities are actually smaller with this invention in all cases except one, in which the viscosity shows only a small (~5% increase).

Moreover, the blends of PLA A with MPC 1, 2 or 3 all exhibit a greater degree of shear thinning than PLA A by itself, which is another important advantage of the invention. Lower viscosity at high shear rates, such as are seen at the die gap of a melt coating process allows for lower operating pressures, reduced energy expenditures and in some cases lower operating temperatures, all of which can be advantageous.

Specific embodiments:

In specific embodiments, the invention is:

1. A method for making a modified polylactide composition, comprising the steps of
   I. forming a reaction mixture by combining:
   i) 85 to 99.9 weight percent, based on the combined weight of components i) and ii), of a starting linear polylactide resin or mixture of linear polylactide resins wherein the starting linear polylactide resin or mixture of linear polylactide resins has a relative viscosity of 2 to 4.5, the ratio of L-lactic repeating units to D-lactic acid repeating units in the starting linear polylactide resin or mixture of linear polylactide resins is >8:92 and <92:8 and the starting linear polylactide or mixture of linear polylactide resins contains carboxyl end groups and
   ii) 15 to 0.1 weight percent, based on the combined weight of components i) and ii), of a thermoplastic epoxy group-containing polymer having an epoxy equivalent weight of 1000 to 6000, an average of at least three epoxy groups per molecule, a melting temperature of 100° C. or lower and a glass transition temperature of 0° C. or lower;
   II. reacting a portion of the carboxyl groups of the starting linear polylactide resin or mixture of linear polylactide resins with a portion of the epoxy groups of the thermoplastic epoxy group-containing polymer to form a composition that includes a reaction product of components i) and ii) and a quantity of unreacted component i) and III. before, during and/or after step II, melt-blending the reaction mixture or composition formed in step II with iii) at least one branched polyester, wherein the at least one branched polyester has a glass transition temperature of 0° C. or lower and constitutes 1 to 60 weight percent of the combined weights of components i), ii) and iii).

2. The method of embodiment 1 wherein step II is performed by heating the reaction mixture to a temperature of 185° C. to 240° C. for a period of 30 seconds to 5 minutes under shear at a shear rate of at least 100 s$^{-1}$ and then cooling the composition formed in step II to a temperature below 185° C.

3. The method of embodiment 2 wherein step II is performed by heating the reaction mixture to a temperature of 205° C. to 225° C. for a period of 1 to 3.5 minutes under shear at a shear rate of at least 100 s$^{-1}$ and then cooling the composition formed in step II to a temperature below 185° C.

4. The method of any of embodiments 1-3 wherein step III is performed during step II.

5. The method of any of embodiments 1-3 wherein step III is performed after step II.

6. The method of any of embodiments 1-5 wherein in step I, i) 85 to 98 weight percent, based on the combined weight of components i) and ii), of the starting linear polylactide resin or mixture of linear polylactide resins are combined with 15 to 2 weight percent, based on the combined weight of components i) and ii), of the thermoplastic epoxy group-containing polymer.

7. The method of any of embodiments 1-6 wherein components i) and ii) are provided in amounts to provide at least 1 epoxy group per carboxyl group provided by component i).

8. The method of embodiment 7 wherein components i) and ii) are provided in amounts to provide 1 to 3 epoxy groups per carboxyl group provided by component i).

9. The method of any preceding embodiment wherein at least 50% of the end groups of the starting linear polylactide resin or mixture of polylactide resins are carboxyl groups.

10. The method of embodiment 9 wherein at least 55% of the end groups of the starting linear polylactide resin or mixture of polylactide resins i) are carboxyl groups and at least a portion of the linear polylactide resin molecules have two terminal carboxyl groups and no terminal hydroxyl groups.

11. The polyester blend of embodiment 10 wherein 55 to 70% of the end groups of the starting linear polylactide resin or mixture of polylactide resins are carboxyl groups, the starting linear polylactide resin or mixture of linear polylactide resins contains at least 3 weight-% of molecules having only terminal carboxyl groups and a portion of the molecules of the starting linear polylactide or mixture of linear polylactide resins have one hydroxyl terminal group and one carboxyl terminal group.

12. The method of any of embodiments 1-11 wherein component iii) constitutes 20 to 60 percent of the combined weights of components i), ii) and iii).

13. The method of embodiment 12 wherein in step II 5 to 30 percent of the epoxy groups provided by component ii) and 10 to 50 percent of the carboxyl groups provided by component i) react to form the reaction product of components i) and ii).

14. The method of embodiment 13 wherein in step II 10 to 25% of the epoxy groups provided by component ii) and 15 to 35% of the carboxyl groups provided by component i) react to form the reaction product of components i) and ii).

15. The method of any of embodiments 1-14 wherein the thermoplastic epoxy group-containing polymer is a copolymer of monomers that include ethylene and at least one of glycidyl acrylate and glycidyl methacrylate.

16. The method of any of embodiments 1-15 wherein component iii) is a branched polycaprolactone.

17. The method of any of embodiments 1-16, wherein the modified polylactide composition contains a) 4 to 56 weight percent of the reaction product of components i) and ii), b) 20 to 60 weight percent of component iii) and c) 12 to 72 weight percent of the starting linear polylactide resin or mixture of linear polylactide resins, based on the combined weights of a), b) and c).

18. The method of embodiment 17, wherein the modified polylactide composition contains 6 to 36 weight percent of component a), 20 to 60 weight percent of component b) and 20 to 68 weight percent of component c).

19. The method of embodiment 18, wherein the modified polylactide composition contains 8 to 24 weight percent of component a), 20 to 60 weight percent of component b) and 28 to 64 weight percent of component c).

20. The method any of embodiments 1-19, further comprising the step of blending the modified polylactide composition with at least one additional linear polylactide resin to form a diluted modified polylactide composition.

21. The method of embodiment 20, wherein 5 to 30 parts by weight of the modified polylactide composition and correspondingly 95 to 70 parts by weight of the at least one additional linear polylactide resin are blended to form the diluted modified polylactide composition.

22. A modified polylactide composition made in accordance with the method of any of embodiments 1-19.

23. A diluted modified polylactide composition made in accordance with the method of embodiment 20 or 21.

24. A diluted modified polylactide composition of embodiment 20 which contains
A) 0.1 to 24 weight percent, based on the weight of components A), B) and C), of the reaction product of components i) and ii);
B) 1 to 18 weight percent, based on the combined weight of components A), B) and C), of at the least one branched polyester; and
C) 70 to 98.9 weight percent, based on the combined weight of components A), B) and C), of one or more linear polylactide resins wherein the ratio of L-lactic repeating units to D-lactic acid repeating units of the one or more linear polylactide resins is >8:92 and <92:8.

25. The diluted modified polylactide composition of embodiment 24 which contains 0.2 to 12 weight percent of component A), 1 to 18 weight percent of component
B) and 76 to 98.6 weight percent of component C), based on the combined weights of components A), B) and C).

26. The diluted modified polylactide composition of embodiment 25 which contains 0.4 to 7.2 weight percent of component A), 1 to 18 weight percent of component B) and 78.4 to 98.2 weight percent of component C), based on the combined weights of components A), B) and C).

27. A modified polylactide composition comprising:
a) a reaction product of:
i) a starting linear polylactide resin or mixture of linear polylactide resins wherein the starting linear polylactide resin or mixture of linear polylactide resins has a relative viscosity of 2 to 4.5, the ratio of L-lactic repeating units to D-lactic repeating units in the starting linear polylactide resin or mixture of linear polylactide resins is >8:92 and <92:8 and the starting linear polylactide or mixture of linear polylactide resins contains carboxyl end groups, with
ii) a thermoplastic epoxy group-containing polymer having an epoxy equivalent weight of 1000 to 6000, an average of at least three epoxy groups per molecule, a melting temperature of 100° C. or lower and a glass transition temperature of 0° C. or lower;
b) at least one branched polyester having a glass transition temperature of 0° C. or lower; and
c) a linear polylactide resin or mixture of linear polylactide resins.

28. The modified polylactide composition of embodiment 27, which contains 0.1 to 80 weight percent of component a), 1 to 60 weight percent of component b) and 10 to 98.9 weight percent of component c), based on the combined weights of components a), b) and c).

29. The modified polylactide composition of embodiment 28, which contains 2 to 80 weight percent of component a), 20 to 60 weight percent of component b) and 10 to 76 weight percent of component c), based on the combined weights of components a), b) and c).

30. The modified polylactide composition of embodiment 29, which contains 4 to 56 weight percent of component a), 20 to 60 weight percent of component b) and 12 to 72 weight percent of component c), based on the combined weights of components a), b) and c).

31. The modified polylactide composition of embodiment 30, which contains 6 to 36 weight percent of component a), 20 to 60 weight percent of component b) and 20 to 68 weight percent of component c), based on the combined weights of components a), b) and c).

32. The modified polylactide composition of embodiment 31, which contains 8 to 24 weight percent of component a), 20 to 60 weight percent of component b) and 28 to 64 weight percent of component c), based on the combined weights of components a), b) and c).

33. The modified polylactide composition of embodiment 27, which contains 0.1 to 24 weight percent of component a), 1 to 18 weight percent of component b) and 70 to 98.9 weight percent of component c), based on the combined weights of components a), b) and c).

34. The modified polylactide composition of embodiment 33, which contains 0.2 to 12 weight percent of component a), 1 to 18 weight percent of component b) and 76 to 98.6 weight percent of component c), based on the combined weights of components a), b) and c).

35. The modified polylactide composition of embodiment 34, which contains 0.4 to 7.2 weight percent of component a), 1 to 18 weight percent of component b) and 78.4 to 98.2 weight percent of component c), based on the combined weights of components a), b) and c).

36. The modified polylactide composition of any embodiments 27-35 wherein the thermoplastic epoxy group-containing polymer ii) is a copolymer of monomers that include ethylene and at least one of glycidyl acrylate and glycidyl methacrylate.

37. The modified polylactide composition of any of embodiments 27-36 wherein component b) is a polycaprolactone.

38. An article comprising a substrate having coated on at least one surface thereof a modified polylactide composition of any of embodiments 22 or 27-37 or a diluted modified polylactide composition of any of embodiments 23-26.

39. The article of embodiment 38 wherein the substrate is paper or paperboard.

40. The article of embodiment 38 or 39 wherein the substrate is coated on two sides with the polyester blend.

41. The article of any of embodiments 38-40 which is a cup or other food or beverage container.

42. A process for making a coated substrate, comprising
a) melt extruding a modified polylactide composition of any of embodiments 22 or 27-37 or a diluted modified polylactide composition of any of embodiments 23-26 through a slit die to form a melt curtain, which melt curtain travels downward from the slit die toward a substrate to be coated;
b) contacting the melt curtain with at least one surface of the substrate to form a coated substrate having a layer of the modified polylactide composition or diluted modified polylactide composition on at least one surface thereof and
c) quenching the coated substrate to cool the layer of the modified polylactide composition or diluted modified polylactide composition to below 50° C.

43. A process for making a coated substrate, comprising
a-1) melt blending a modified polylactide composition of any of embodiments 17-19 with least one linear polylactide resin having a ratio of L-lactic repeating units to D-lactic repeating units of the one or more linear polylactide resins is >8:92 and <92:8 to form a diluted modified polylactide composition;
a-2) melt extruding the diluted modified polylactide composition formed in a-1) through a slit die to form a melt curtain of the diluted modified polylactide composition which travels downward from the slit die toward a substrate to be coated;
b) contacting the melt curtain with at least one surface of the substrate to form a coated substrate having a layer of the diluted modified polylactide composition on at least one surface thereof and
c) quenching the coated substrate to cool the layer of the diluted modified polylactide composition to below 50° C.

44. The process of embodiment 43 wherein the diluted modified polylactide composition contains
A) 0.1 to 24 weight percent, based on the weight of components A), B) and C), of the reaction product of components i) and ii);
B) 1 to 18 weight percent, based on the combined weight of components A), B) and C), of at the least one branched polyester; and
C) 70 to 98.9 weight percent, based on the combined weight of components A), B) and C), of one or more linear polylactide resins wherein the ratio of L-lactic repeating units to D-lactic acid repeating units of the one or more linear polylactide resins is >8:92 and <92:8.

What is claimed is:
1. A method for making a modified polylactide composition, comprising the steps of
I. forming a reaction mixture by combining:
i) 85 to 99.9 weight percent, based on the combined weight of components i) and ii), of a starting linear polylactide resin or mixture of linear polylactide resins wherein the starting linear polylactide resin or mixture of linear polylactide resins has a relative viscosity of 2 to 4.5, the ratio of L-lactic repeating units to D-lactic acid repeating units in the starting linear polylactide resin or mixture of linear polylactide resins is >8:92 and <92:8 and the starting linear polylactide or mixture of linear polylactide resins contains carboxyl end groups and ii) 15 to 0.1 weight percent, based on the combined weight of components i) and ii), of a thermoplastic epoxy group-containing polymer having an epoxy equivalent weight of 1000 to 6000, an average of at least three epoxy groups per molecule, a melting temperature of 100° C. or lower and a glass transition temperature of 0° C. or lower;

II. reacting a portion of the carboxyl groups of the starting linear polylactide resin or mixture of linear polylactide resins with a portion of the epoxy groups of the thermoplastic epoxy group-containing polymer to form a composition that includes a reaction product of components i) and ii) and a quantity of unreacted component i) and III. after step II, melt-blending the reaction mixture or composition formed in step II with iii) at least one branched polycaprolactone, wherein the at least one branched polycaprolactone has a glass transition temperature of 0° C. or lower and constitutes 30 to 60 weight percent of the combined weights of components i), ii) and iii).

2. The method of claim 1 wherein step II is performed by heating the reaction mixture to a temperature of 185° C. to 240° C. for a period of 30 seconds to 5 minutes under shear at a shear rate of at least 100 s$^{-1}$ and then cooling the composition formed in step II to a temperature below 185° C.

3. The method of claim 2 wherein in step I, i) 85 to 98 weight percent, based on the combined weight of components i) and ii), of the starting linear polylactide resin or mixture of linear polylactide resins are combined with 15 to 2 weight percent, based on the combined weight of components i) and ii), of the thermoplastic epoxy group-containing polymer.

4. The method of claim 3 wherein components i) and ii) are provided in amounts to provide 1 to 3 epoxy groups per carboxyl group provided by component i).

5. The method of claim 3 wherein at least 50% of the end groups of the starting linear polylactide resin or mixture of polylactide resins are carboxyl groups.

6. The method of claim 5 wherein at least 55% of the end groups of the starting linear polylactide resin or mixture of polylactide resins i) are carboxyl groups and at least a portion of the linear polylactide resin molecules have two terminal carboxyl groups and no terminal hydroxyl groups.

7. The method of claim 1 wherein the thermoplastic epoxy group-containing polymer is a copolymer of monomers that include ethylene and at least one of glycidyl acrylate and glycidyl methacrylate.

8. The method of claim 1, wherein the modified polylactide composition contains a) 4 to 56 weight percent of the reaction product of components i) and ii), b) 30 to 60 weight percent of component iii) and c) 12 to 72 weight percent of the starting linear polylactide resin or mixture of linear polylactide resins, based on the combined weights of a), b) and c).

9. The method of claim 1, further comprising the step of blending the modified polylactide composition with at least one additional linear polylactide resin to form a diluted modified polylactide composition.

10. A modified polylactide composition made in accordance with the method of claim 1.

* * * * *